United States Patent [19]

Kokubo et al.

[11] 4,275,012

[45] Jun. 23, 1981

[54] PROCESS FOR CONTINUOUS REFINING OF OILS AND FATS

[75] Inventors: Isao Kokubo, Wakayama; Yoshiharu Kawahara, Osaka, both of Japan

[73] Assignee: Kao Soap Co., Ltd., Tokyo, Japan

[21] Appl. No.: 140,393

[22] Filed: Apr. 14, 1980

[30] Foreign Application Priority Data

May 9, 1979 [JP] Japan .................................. 54-56561

[51] Int. Cl.³ .............................................. C11C 3/02
[52] U.S. Cl. ................................................ 260/421
[58] Field of Search ......................... 260/421; 568/854

[56] References Cited

U.S. PATENT DOCUMENTS

4,164,506  8/1979  Kawahara et al. .................. 260/421

*Primary Examiner*—John F. Niebling
*Attorney, Agent, or Firm*—Blanchard, Flynn, Thiel, Boutell & Tanis

[57] ABSTRACT

In a process for continuous refining of oils and fats, starting oils and fats and a lower alcohol containing 0.06 to 0.15 wt. %, based on the starting oils and fats, of an acid catalyst are continuously fed into a multi-stage reaction tank equipped with a stirrer and prevented from the back mixing, then the oils and fats are refined at 67° C. or below, the refined oils and fats are continuously taken out together with an excess of the lower alcohol containing the acid catalyst, they are separated into the oil and fat layer and the lower alcohol layer, and most of the lower alcohol layer is recycled into the reaction tank.

5 Claims, 6 Drawing Figures

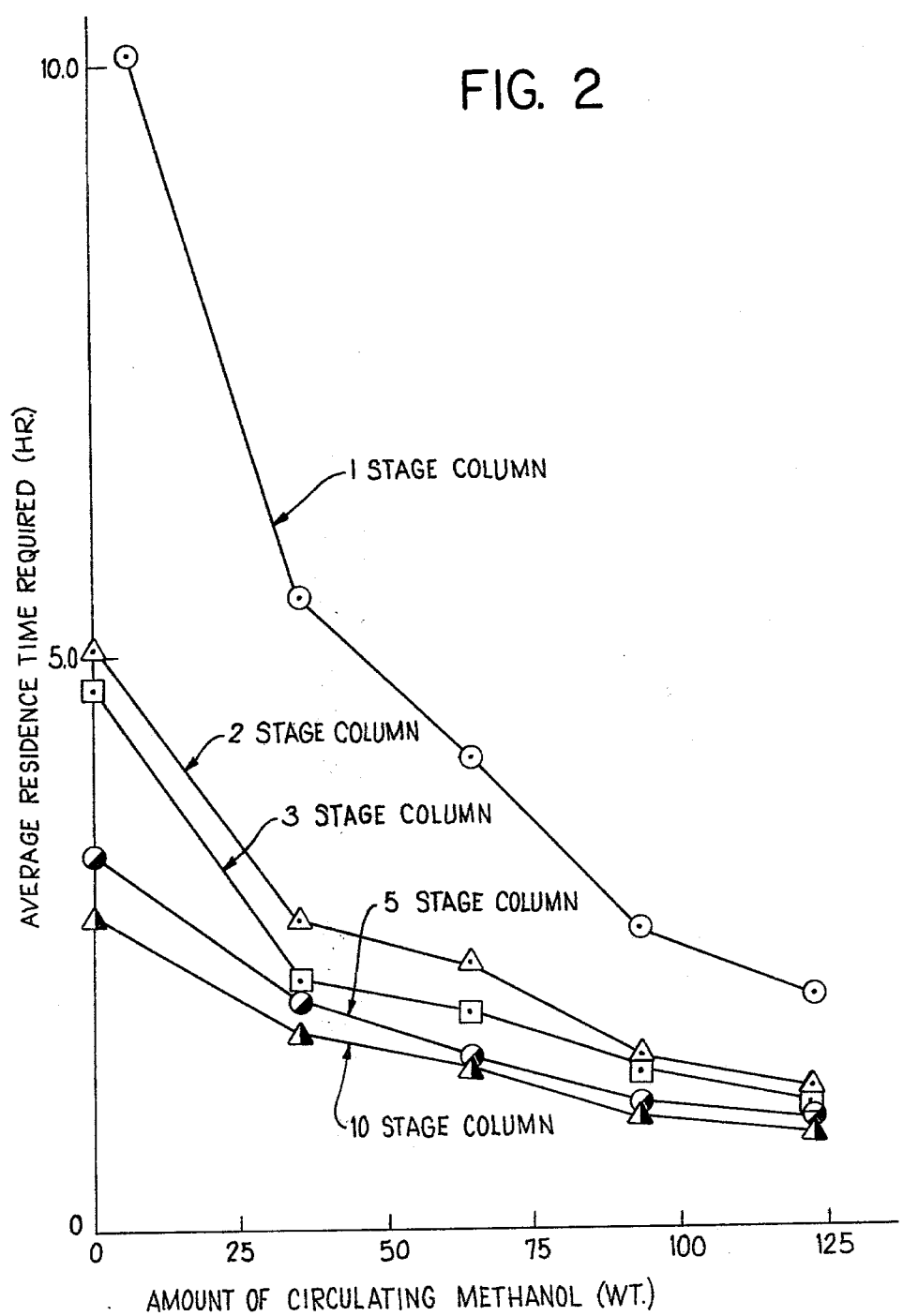

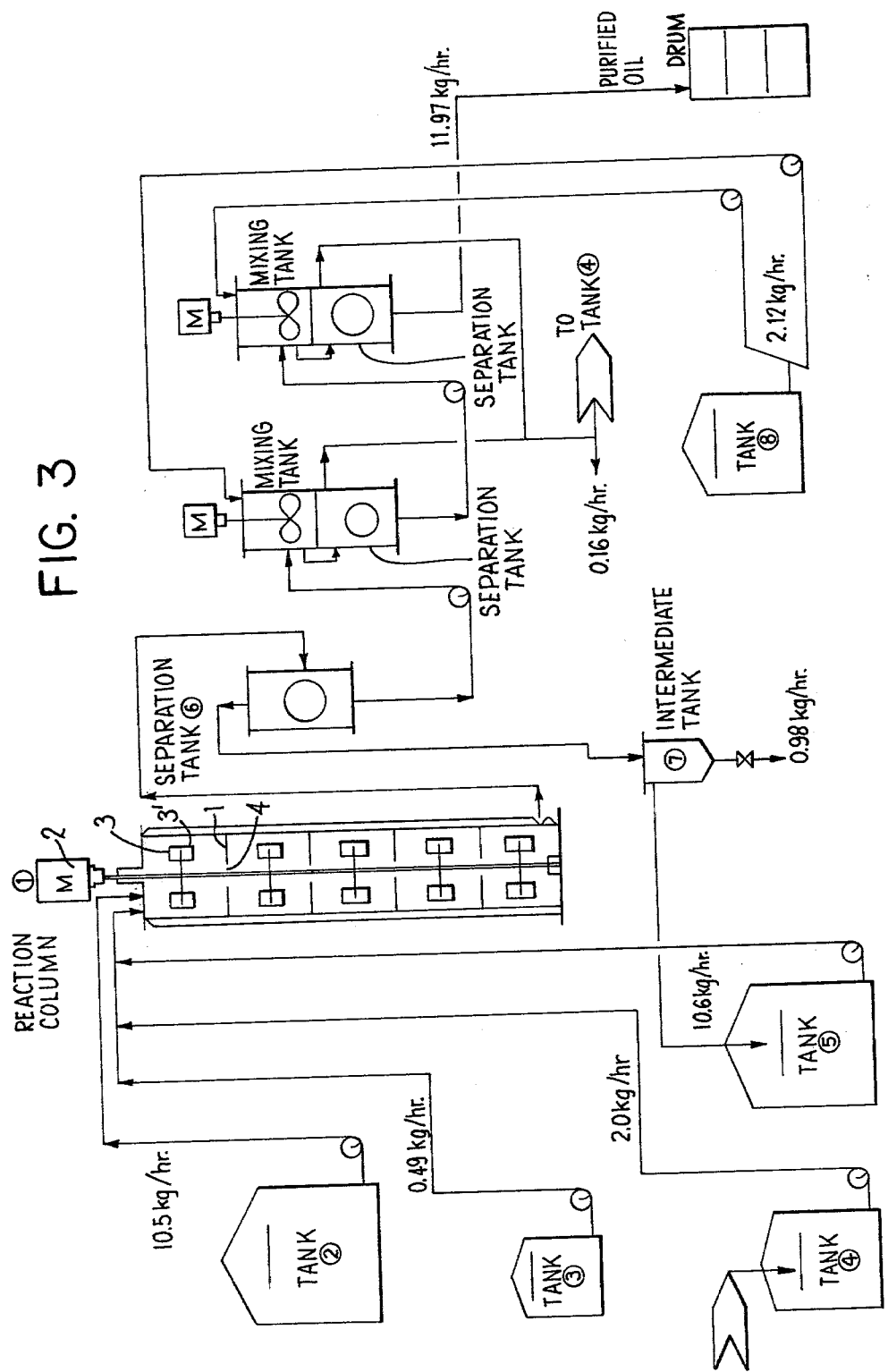

PROCESS FOR CONTINUOUS REFINING OF OILS AND FATS

BACKGROUND OF THE INVENTION

1. Field of the Invention

The present invention relates to a process for continuous refining of oils and fats by continuously contacting crude oils and fats with a lower alcohol in the presence of an acid catalyst. More particularly, the present invention relates to a process for continuous refining of crude oils and fats containing free fatty acids and impurities by removing the impurities prior to interesterification thereof with a lower alcohol, characterized in that the oils and fats are continuously contacted with the lower alcohol in the presence of the acid catalyst under special operation conditions in a special reaction device.

2. Description of Prior Arts

Lower alcohol esters of fatty acids are widely used as starting materials of higher alcohols by catalytic reduction thereof and also as starting materials of surfactants. They are produced generally by an interesterification method between oils or fats and the lower alcohol or by an esterification method wherein fatty acids obtained by the hydrolysis of oils or fats are esterified with a lower alcohol. For the production of the lower alcohol esters of fatty acids on an industrial scale, there has been employed generally a method wherein the oils and fats are interesterified with a lower alcohol in the presence of an alkali catalyst.

The crude oils and fats used as the starting materials generally contain impurities such as polypeptides and phospholipids in addition to about 2–5% of free fatty acids, though the impurities are various depending on kinds of the oils and fats. If those oils and fats are subjected directly to the interesterification, an alkali used as interesterification catalyst is consumed by the free fatty acids contained therein and, therefore, the interesterification reaction does not proceed sufficiently unless the alkali is supplemented in a large amount. Further, oils and fats dissolved in glycerol layer are increased in amount by emulsification and solubilization effects of resulting fatty acid soaps. Thus, problems are posed such as deterioration of qualities of the esters and by-produced glycerol and increase of loss.

For solving those problems, there have been employed following methods (1)–(3) wherein purification is effected to remove impurities such as free fatty acids from the reaction system prior to the interesterification step and following methods (4) and (5) wherein a special step is employed, in order to carry out the interesterification reaction of oil or fat with a lower alcohol in the presence of an alkali catalyst at a relatively low temperature of, for example, below 100° C.

(1) Alkali refining method:

An alkali such as sodium hydroxide is used for removing free fatty acids in the form of fatty acid soaps [see, for example "Yushi Kagaku (Chemistry of Oils and Fats), Iwanami Zensho].

(2) Extraction-with-solvent method:

Free fatty acids are removed by extraction with a solvent such as methanol taking advantage of difference in solubility between the fatty acids and the triglyceride in the solvent (see, for example, the specification of U.S. Pat. Nos. 1,371,342 and 2,345,097).

(3) Steam refining method:

Steam is introduced in the oils and fats to distill out the free fatty acids together with the steam [see, for example, "Yushi Kagaku Kogyo (Oils and Fat Chemical Industry), Kogyo Gijutsu Shinsho].

(4) Excess addition method:

The alkali is used in an amount corresponding to the free fatty acids in addition to a catalytic amount thereof in the interesterification step.

(5) Pre-esterification method:

First, the free fatty acids are esterified in the presence of an acid catalyst and then the interesterification of the oils and fats is effected in the presence of an alkali catalyst (see, for example, the specifications of Japanese Patent Publication No. 1823/1960 and Japanese Patent Laid-Open No. 62926/1975).

However, those conventional methods have demerits. Namely, in method (1), the foots thus removed out must be treated and yield of the oils and fats is poor to elevate the costs, though not only free fatty acids but also other impurities can be removed efficiently. In method (2), the solvent is required in a considerably large quantity for removing the free fatty acids by sufficiently lowering acid value (A.V.). For example, in case methanol was used, methanol was necessitated in a quantity of 5 times as much weight as coconut oil for lowering A.V. from about 10 to 0.8. Further, according to method (2), impurities such as polypeptides and phospholipids can hardly be removed. If method (3) is employed, a large apparatus is required and a problem of treatment of the distillate is posed. In method (4), serious problems such as deterioration of qualities and increase of loss are posed due to the emulsification and solubilization effects of resulting fatty acid soaps as described above. Method (5) is relatively easy on the industrial scale. However, it has been reported that according to method (5), impurities as polypeptides and phospholipids are not removed at all but they remain in the oils and fats, though free fatty acids can be esterified. If the oils and fats still containing the polypeptides and phospholipids are directly subjected to the interesterification reaction, those impurities are substantially distributed in the glycerol layer and, therefore, the subsequent steps of recovery and purification of glycerol become difficult, loss of the oils and fats and also loss of glycerol are increased, and reduction activity in the catalytic reduction of the resulting lower alcohol esters of fatty acids into the higher aliphatic alcohol is reduced by those impurities. As an improvement of those methods, there has been proposed a method of producing lower alcohol esters of fatty acids in the specification of U.S. Pat. No. 4,164,506, wherein a crude oil or fat is treated with a lower alcohol in a quantity larger than its solubility in the oil or fat in the presence of an acid catalyst to esterify the free fatty acids or, alternatively, free fatty acids contained in the crude oil or fat are esterified with a lower alcohol in the presence of an acid catalyst, then a lower alcohol is added thereto in a quantity larger than its solubility in the oil or fat to effect the reaction, the reaction mixture is divided into a layer of the oil or fat and a layer of the lower alcohol, the lower alcohol layer is removed out, and finally thus refined oil or fat is interesterified with a lower alcohol in the presence of an alkali catalyst. In this method, the free fatty acids are esterified under acidic condition and, at the same time, impurities such as polypeptides and phospholipids are decomposed and thereby dissolved in the alcohol prior to the interesterification reaction. Namely, in this method, the free fatty acids and impurities such as polypeptides and phospholipids are dissolved in the excessive lower alcohol layer or in an additional quantity of the lower alcohol layer which will be supplemented later on, whereby they are removed from the oil or fat.

This method comprising the pre-esterification and subsequent removal of the lower alcohol layer is an excellent method of refining an oil or fat and it has various merits. An object of the present invention is to continuously carry out such a refining process comprising the pre-esterification and separation of the lower alcohol layer. As compared with a batch process, such a continuous process has significant merits that operation of the device is simplified to facilitate the mass production and that running costs can be lowered.

However, in the conventional process wherein an acid is used as catalyst in the pre-esterification reaction, esterification reaction velocity is low and a long time is required for the reaction and complete esterification is unexpectable due to water by-produced therein under ordinarily employed conditions. Therefore, the continuation of the operation has been difficult. Further, though the reaction velocity can be elevated by elevating the reaction temperature or by increasing in amount of the acid catalyst, a side-reaction (interesterification reaction of the oil or fat with the lower alcohol) also occurs when the reaction temperature is elevated or amount of the catalyst is increased. As a result of the interesterification reaction, glycerol, monoglycerides and diglycerides are formed. Those products are highly soluble in the lower alcohol to invite loss of glyceride and glycerol. In addition, the division of the mixture into a layer of the oil or fat and a layer of the lower alcohol by allowing the mixture to stand becomes difficult, whereby the intended effect of refining the oil or fat cannot be obtained. Thus, the interesterification reaction should be controlled as far as possible.

For carrying out the reaction continuously, esterification reaction velocity must be increased. On the other hand, the interesterification reaction must be inhibited as far as possible. Thus, both requirements which oppose to each other must be satisfied.

SUMMARY OF THE INVENTION

After intensive investigations on the continuation of the refining of oils and fats according to the pre-esterification under such circumstances, the inventors have found that the object can be attained by carrying out the pre-esterification reaction in a special reaction device under special operation conditions. The present invention has been attained on the basis of this finding.

The present invention provides a process for continuous refining of oils and fats characterized in that a starting oil or fat and a lower alcohol containing 0.06–0.15 wt. %, based on the starting oil or fat, of an acid catalyst are continuously fed into a multistage reaction tank provided with a stirring device wherein back mixing hardly occurs to effect the refining treatment of the oil or fat at a temperature of below 67° C., preferably 58°–67° C., thus refined oil or fat is continuously taken out together with the greatly excessive lower alcohol containing the acid catalyst, they are then divided into a layer of the oil or fat and a layer of the lower alcohol and the major part of the lower alcohol layer is recycled into an inlet of the reaction tank.

BRIEF DESCRIPTION OF DRAWINGS

FIG. 2 is a graph showing results of test 2.
FIG. 3 is a flow sheet of the process of the present invention.

Figure 1:
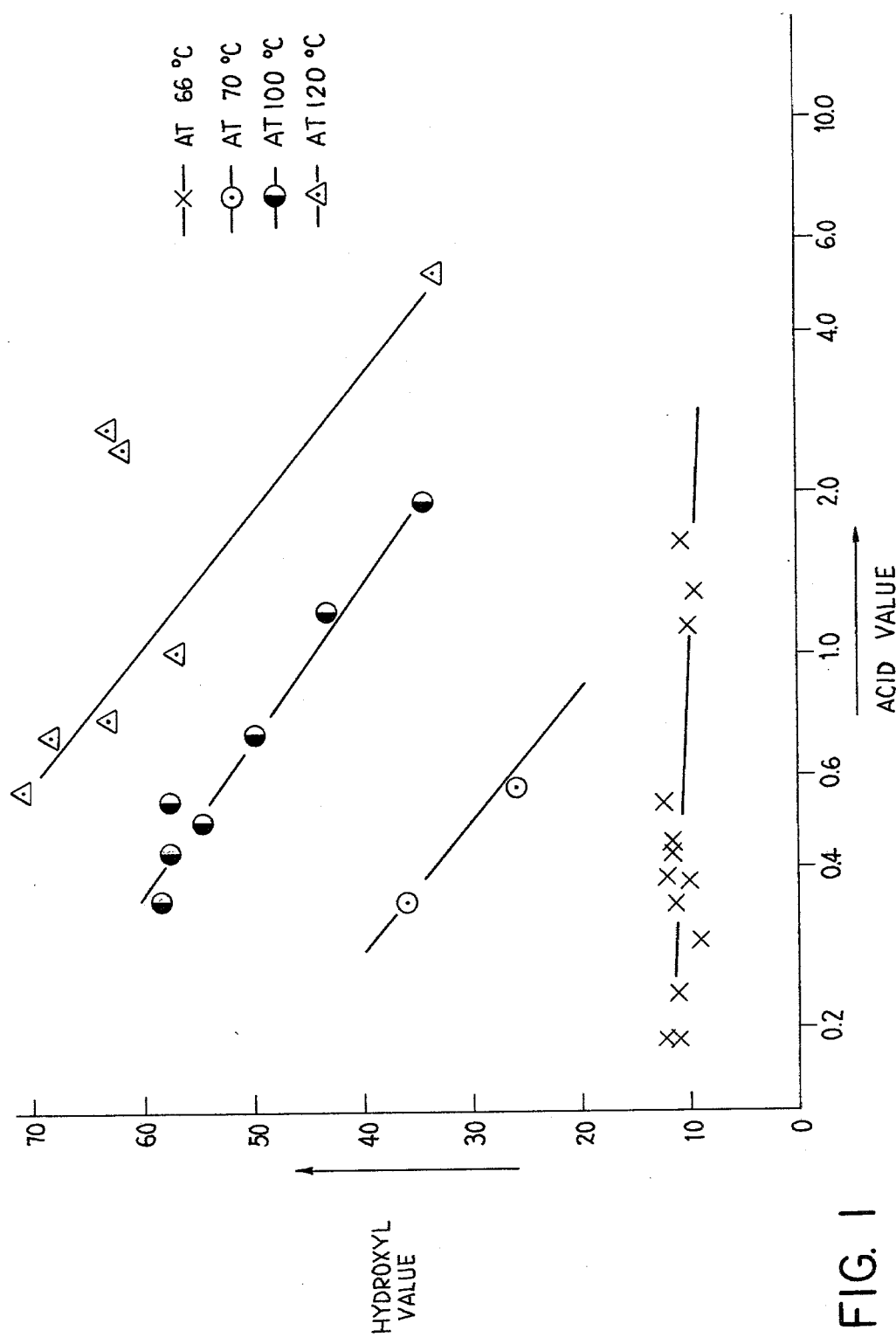
FIG. 1 is a graph showing results of test 1.

1 ... Partition panel, 2 ... Motor, 3 ... Stirrer, 3'... Stirring blade, 4 ... Opening for liquid transfer, 5 ... Stirring shaft, 6 ... Outer cylinder, 7 ... Inner cylinder The multistage reaction tank wherein back mixing hardly occurs is divided into at least two chambers each having a stirring device. They are so designed that back mixing which causes a flow against the flow of the liquid will not be caused or that the back mixing will be minimized. The two or more chambers are connected together in series. More preferably, the reaction tank comprises at least 3 chambers, particularly 5–7 chambers. Concretely, it is, for example, a multistage reaction column shown in FIGS. 3 and 4. The multistage reaction column shown in FIGS. 3 and 4 comprises multiple chambers separated from one another by partition panels 1. The chambers each have a stirrer 3 drived by one motor 2. The starting oil or fat, acid and recycling lower alcohol are fed through the top of the column. They flow downwards through liquid-transfer openings 4 of the partition panel 1 and then subsequent chambers, while they are agitated with stirring blades 3' in each chamber, and finally taken out from the bottom chamber. In the reaction tank, size of the liquid-transfer openings 4 is determined so that flow rate of the liquid flowing through the openings 4 of the partition panels 1 will be higher than back flow of the liquid caused by the agitation, whereby back mixing is minimized. By thus effectively preventing the back mixing, the interesterification reaction can be prevented effectively. Consequently, as compared with conventional processes, catalyst concentration can be elevated more easily while the interesterification reaction is controlled, whereby reaction velocity can be elevated.

In the multistage reaction column according to the present invention, ordinary stirring blades may be used. However, more preferred stirrers comprise a rotating shaft provided with blades having a baffle boards at an end thereof. If such a stirrer is used, the mixture flowing downwards moves towards an end of the stirring blade and thereby agitated by the rotating baffle board. The mixture thus flows downwards through an opening of the next partition panel into the next chamber. In another embodiment, at least two, independent reaction tanks each having a stirrer are connected together in series; the starting oil or fat, acid and lower alcohol are fed continuously into a first reaction tank in the same manner as above; the refined oil or fat and the acid-containing lower alcohol are taken out continuously from the last reaction tank; and the lower alcohol is used again by circulation.

The lower alcohol should be used in a quantity greatly larger than its solubility in the oil or fat. It is preferred to circulate 40–200 parts by weight, particularly 90–120 parts by weight, of the lower alcohol per 100 parts by weight of the oil or fat. If the lower alcohol is circulated in a quantity of less than 0.4 part per part of the oil or fat, reaction velocity is reduced, whereby residence time is prolonged to cause the interesterification reaction unfavorably. As the lower alcohols, there may be used aliphatic monohydric alcohols of 1-3 carbon atoms such as methanol, ethanol and isopropanol. From economical viewpoint, methanol is most preferred. As the acid catalyst, there may be used sulfuric acid, p-toluenesulfonic acid, hydrochloric acid, etc. The catalyst is used in an amount of 0.06-0.15 wt. %, preferably 0.08-0.12 wt. %, based on the oil or fat.

The esterification of the free fatty acids in the presence of the acid catalyst is carried out at 60°-120° C. In the process for refining oil or fat according to the present invention, it is desirable to employ a temperature as low as possible for controlling the interesterification reaction. The present invention has merits that catalyst concentration can be increased by using the above described reaction device and that a sufficient esterification reaction velocity can be attained at a relatively low reaction temperature by keeping a large quantity of the lower alcohol in the reaction system. Concretely, the reaction is carried out at a temperature of below 67° C., preferably 58°-67° C., more preferably 60°-67° C. At a temperature above 70° C., the interesterification reaction proceeds rapidly to invite unfavorable results.

The crude oils and fats to be refined according to the present invention include vegetable oils such as coconut oil, palm oil, palm kernel oil, cotton seed oil and soybean oil as well as animal oils and fats such as beef tallow, lard and fish oil. Those oils and fats may be either unrefined or incompletely refined materials containing free fatty acids, polypeptides and phospholipids.

Thus, by the process of the present invention, oils and fats can be refined continuously at a low temperature while the interesterification reaction is sufficiently controlled without lowering the esterification reaction velocity of the free fatty acids, though the prevention of the esterification reaction velocity from being lowered has been difficult in the prior art. Another remarkable characteristic feature of the present invention is that the free fatty acids are esterified to reduce acid value and at the same time the oils and fats are treated with the acid catalyst to dissolve other impurities such as polypeptides and phospholipids in the excess lower alcohol, thereby removing them therefrom, unlike the conventional solvent extraction method wherein free fatty acids are removed, taking advantage of difference in solubility or unlike the pre-esterification method wherein the esterification of free fatty acids with a lower alcohol is effected to form fatty acid esters and also to reduce acid value. Namely, the impurities themselves cannot be easily removed from the oil or fat by the conventional solvent extraction method because of their poor solubilities in the solvent. However, according to the process of the present invention, during the esterification of the fatty acids under acidic conditions (in the presence of, for example, sulfuric acid), impurities such as polypeptides and phospholipids are decomposed, whereby solubilities of them in the lower alcohol are increased to remarkably improve the impurity-removing effect of the solvent. Further, the unreacted free fatty acids are distributed in the lower alcohol layer. This fact is quite advantageous for the removal of the free fatty acids. Though glycerol and a part of the oil or fat are dissolved in the lower alcohol layer, this fact is insignificant, since glycerol is hardly formed by the process of the present invention as described above and the oils and fats dissolved therein can be recovered by a suitable method.

If thus obtained, refined oil or fat is interesterified with a lower alcohol in the presence of an alkaline catalyst, lower alcohol esters of fatty acids can be obtained. In the interesterification reaction, the alkaline catalyst can be saved remarkably, since free fatty acids and water have been removed therefrom. In addition, side reaction (saponification reaction) can be controlled, thereby reducing loss of the oil. If the fatty acid/lower alcohol esters thus obtained are then subjected to catalytic reduction to form higher alcohols, reduction reaction velocity can be elevated remarkably.

The fatty acid esters thus obtained by the process of the present invention are free of impurities which deteriorate hue thereof. Therefore, the esters have a quite excellent hue. As for by-produced glycerol, loss thereof due to contamination with the oil or fat or due to the emulsification is insignificant. Thus, glycerol of high qualities which can be refined easily can be obtained in an improved yield. In summary, a large quantity of crude oil or fat can be refined in a small device within a short period of time to obtain highly refined oil or fat by continuously effecting the esterification of crude oil or fat containing various impurities and washing thereof with a lower alcohol in one step. After the subsequent interesterification treatment, fatty acid esters and glycerol of quite high qualities can be obtained.

The following tests and examples further illustrate the present invention, wherein percentages are given by weight.

TEST 1

Variation in degree of occurrence of side interesterification reaction according to reaction temperatures in the esterification of free fatty acids in an oil was examined by carrying out the reaction batchwise.

| Starting materials charged: | |
| --- | --- |
| Crude coconut oil | 1,000 g |
| Methanol | 237.1 |
| 98% Sulfuric acid | 1.0 |

The above materials were charged in a reaction vessel and stirred together and temperature was raised. When the temperature reached a given point, methanol introduction was begun. Methanol introduction rate was 87.8 g/hr.

The reaction vessel was a double glass cylinder. A heat medium flowed in an outer cylinder to control temperature of the reaction mixture charged in an inner cylinder. The inner cylinder was a reaction tank having an inside diameter of 110 $\phi$, depth of 200 mm and volume of 2 liters. Stirring blades are inserted in the inner cylinder. The methanol introduction and evaporation were effected by means of nozzles provided at the bottom and the top of the reaction vessel, respectively. Methanol thus evaporated was condensed in a condenser and removed from the reaction system. Methanol thus evaporated and condensed contained water formed by the reaction of fatty acids with methanol.

The reaction mixture in the reaction tank was sampled and washed with water and A.V. and hydroxyl value (OH.V.) thereof were measured at certain time intervals. When AV was reduced to below a given value, the reaction was terminated.

The results are shown in FIG. 1. In FIG. 1, acid value (A.V.) is plotted as abscissa and hydroxyl value (OH.V.) as ordinate on semilogarithmic graph paper. A.V. indicates amount of free fatty acids and OH.V. indicates total amount of glycerol, monoglycerides and diglycerides formed by the interesterification reaction. As the reaction proceeds, the free fatty acids are reduced in amount and A.V. is lowered. If the interesterification takes place, glycerol, monoglycerides and diglycerides are formed to elevate OH.V. Thus, for improving the effect of refining by methanol layer separation and for elevating glycerol yield, it is preferred to lower both A.V. and OH.V. as far as possible. It is apparent from the results shown in FIG. 1 that OH.V. is elevated sharply at a temperature above 70° C., while the OH.V. elevation is insignificant at around 60°–66° C.

Test 2

The same reaction as in Test 1 was carried out under the same conditions as above except that quantity of methanol circulated and number of stages in the reaction device were altered to examine influences thereof on reaction velocity (reaction time).

(Device for the experiment)

Figure 4A:
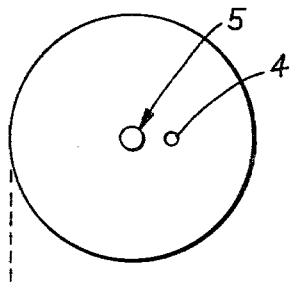
FIGS. 4 show chambers formed by using partition panels in a multistage reaction tank used in the present invention, (a) being a plan of the partition panel, (b) being an enlarged cross section of the chamber and (c) being a rough plan of stirring blades in the chamber.
Figure 4B:
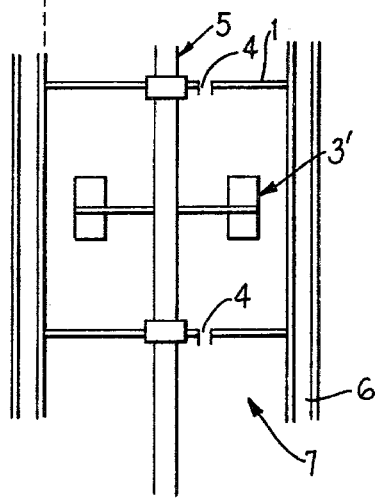
Figure 4C:
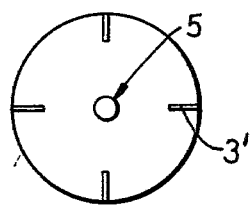

A reaction device having a structure shown in FIGS. 3 and 4 and made of stainless steel (SUS 316 L) was used. The column had an inside diameter of 2.5 inches, length of 60 cm and volume of 1.94 liters. A stirring shaft was arranged through the center of the column. The shaft was fitted with 10 stirring blades in each chamber. Position of the blades could be altered freely. Partition panels in the column could be placed at desired positions in the column according to operation conditions.

(Reaction conditions)

Coconut oil, methanol and sulfuric acid used for the reaction were fed through the top of the column. They flowed downwards and discharged as a mixture of the oil and methanol at the bottom of the column. The mixture thus discharged was divided into layers in a separation tank. A part of methanol layer was taken out from the system and the remainder was sent to the top of the column by means of a pump for using it again in the reaction system. The respective starting materials were fed from tanks by means of quantitative pumps.

(Supply of starting materials)

Reaction temperature was 60°±2° C. The temperature was controlled within this range with warm water flowing in the outer column. Fresh methanol and catalyst were fed continuously in amounts of 23.6 wt. % and 0.084 wt. %, respectively, based on the coconut oil. Amount of the circulating methanol layer was variable in the range of 0–122% based on coconut oil supply according to operation conditions.

(Results of the experiment)

Crude oil of A.V. 5.8 was continuously treated while number of stages (chambers formed by arranging partition panels in the reaction column) and amount of circulating methanol were varied. Average residence time required for attaining A.V. of less than 0.5 was measured. The results are shown in FIG. 2 wherein amount of circulating methanol (wt. % based on coconut oil fed) is plotted as abscissa and average residence time required is plotted as ordinate, using number of stages as parameter.

It is apparent from FIG. 2 that reaction velocity is elevated as number of stages in the reaction column is increased and as amount of circulating methanol is increased. However, the effect is substantially no more improved even if number of the stages is increased to more than 10 or amount of circulating methanol is increased to more than 100%. In this case, fatty acid content of the oil collected at the outlet of the reaction column was less than A.V. 0.5 (after removal of sulfuric acid catalyst by washing with water). The subsequent interesterification reaction proceeded smoothly.

EXAMPLE 1

Crude coconut oil was continuously refined according to a flow sheet of the process of the present invention shown in FIG. 3. Reaction column ① was a vertical 5-stage column of a total volume of 32.6 liters (made of SUS 316 L). The column was divided into 5 chambers with partition panels 1. Turbine blades 3' comprising 4 blades were provided in each chamber. The liquid was introduced into the respective chambers and discharged therefrom through an aperture between the partition panel and the shaft. Flow rate of the liquid passing through the aperture was controlled so that the liquid would not flow backward due to the stirring force. The reaction column per se was a double column (see FIG. 4) composed of inner and outer cylinders. Temperature was controlled with warm water.

Coconut oil stored in tank ② was guided at a given rate to an inlet of the reaction column by means of a pump. All pipes were double pipes to keep the contents of the pipes warm with the warm water so that the solidification of the oil at a low temperature would be prevented. 1.79% solution of sulfuric acid in methanol was sent from tank ③ to an inlet of the reaction column by means of a quantitative pump. Methanol separated out in a methanol washing step was kept in tank ④ which was maintained at a constant temperature so as to prevent the separation of oil due to temperature lowering. Methanol thus separated out was sent to the inlet of the reaction column by means of a quantitative pump. Methanol separated out from a mixture of the oil and methanol (discharged from the reaction column) in a separation tank was stored in tank ⑤ and then fed into the reaction column in a given amount by means of a quantitative pump. This line was also kept at a given temperature. The liquid surface in the column was controlled by leading the pipe to an upper part of the column. The mixture was guided into separation tank ⑥. Methanol discharged from separation tank ⑥ was stored in intermediate tank ⑦ from which a major part thereof was sent to tank ⑤ but a part thereof was taken out from the system. By this treatment, a major part of impurities contained in the oil was discharged. The oil layer discharged from separation tank ⑥ was sent to the methanol washing step and discharged from the system as refined oil after washing with methanol in two stages. Fresh methanol was stored in tank ⑧ and sent to the mixing tanks in methanol washing step by means of quantitative pumps. Reaction conditions:

Reaction temperature: 60°±2° C.
Methanol supply into reaction column: 111 wt. % (based on coconut oil)
  (87.4 wt. %, based on coconut oil, of which was the circulating methanol)

Catalyst (sulfuric acid) supply: 0.084 wt. % (based on coconut oil)

Material balance in the operation is shown in the flow sheet of FIG. 3.

After the continuous treatment for 72 hours under the above described reaction conditions, amount of coconut oil thus treated was 756 kg in total.

Qualities of thus refined coconut oil were examined to reveal that it was superior to the same oil refined by batch process. Namely, when the refined coconut oil was converted to its methyl ester by continuous interesterification reaction, the resulting methyl ester had a hydrogenation activity superior to that of the methyl ester obtained by the conventional process.

Yield of glycerol formed by the reaction was 0.17% based on coconut oil which was less than that formed by the conventional batch process. Quantity of the oil dissolved in the methanol layer was 0.97% which was equivalent to that in the batch process.

EXAMPLE 2

Pre-esterification reaction of beef tallow was carried out continuously in the same device as in Example 1. Beef tallow which had been treated with activated clay was placed in tank ②  (see the flow sheet used in Example 1) and sent to the reaction column by means of the quantitative pump. The lines were kept at a temperature above melting point of the beef tallow. Reaction conditions:

Reaction temperature: 60°±1.0° C.

Methanol supply into reaction column: 128.5 wt. % (based on beef tallow)
(103.5 wt. %, based on beef tallow, of which was the circulating methanol)

catalyst (sulfuric acid): 0.109% (based on beef tallow)

Flow rates in the lines:

Beef tallow supply (fatty acid content: 4.65%): 4.94 kg/hr. (from tank ②)

Methanol:

Tank ④→reaction column: 100 kg/hr.

Tank ⑤→the reaction column: 5.59 kg/hr.

Tank ③ (H$_2$SO$_4$ concentration 2.0%)→0.27 kg/hr.

Tank ⑧→Methanol washing step: 1.071 kg/hr.

Refined oil: 5.425 kg/hr.

Methanol taken out from tank ⑦: 0.865 kg/hr.

Tanks ④ and ⑤ contained the recovered methanol layer. Tank ③ contained 2% solution of sulfuric acid in methanol. Tank ⑧ contained commercial methanol.

As a result, 96% of fatty acids contained in the beef tallow could be removed (fatty acid content of beef tallow: 4.65%).

Methyl esters of beef tallow fatty acids obtained from thus refined beef tallow and methanol had a hydrogenation activity equivalent to that of methyl esters of beef tallow refined by the batch process. Solubility of the beef tallow in the methanol layer was also equivalent to that obtained in the batch process.

What is claimed is:

1. A process for continuous refining of oils and fats characterized in that a starting oil or fat and a lower alcohol containing 0.06-0.15 wt. %, based on the starting oil or fat, of an acid catalyst are continuously fed into a multistage reaction tank provided with a stirring device wherein back mixing hardly occurs to effect the refining treatment of the oil or fat at a reaction temperature of below 67° C., thus refined oil or fat is continuously taken out together with the excessive lower alcohol containing the acid catalyst, they are then divided into a layer of the oil or fat and a layer of the lower alcohol and the major part of the lower alcohol layer is recycled into an inlet of the reaction tank.

2. A process for continuous refining of oils and fats according to claim 1 wherein amount of the lower alcohol recycled is 40-200 parts per 100 parts of the oil or fat fed.

3. A process for continuous refining of oils and fats according to claim 1 or 2 wherein reaction temperature is 58°-67° C.

4. A process for continuous refining of oils and fats according to claims 1 or 2 wherein the multistage reaction tank in which back mixing hardly occurs is a reaction tank comprising 3-7 stages.

5. A process for continuous refining of oils and fats according to claim 4 wherein the multistage reaction tank in which back mixing hardly occurs comprises at least 3 chambers separated from one another by partition panels each having an opening for liquid transfer.

* * * * *